United States Patent Office 2,839,463
Patented June 17, 1958

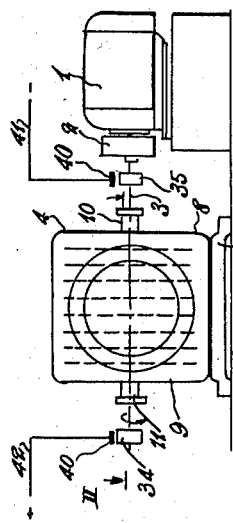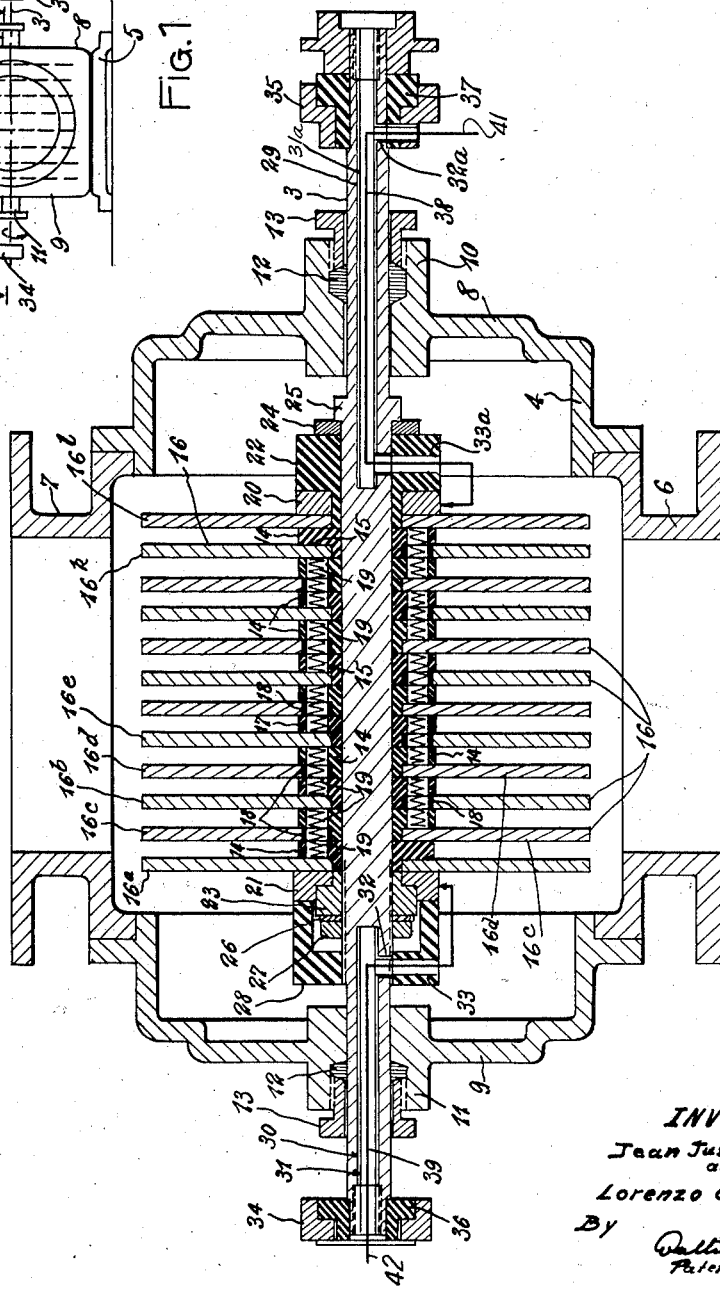

2,839,463

DEVICE FOR TREATMENT AND PARTICULARLY STERILISATION OF LIQUIDS

Jean Justin Leon Vellas and Lorenzo Casanovas Puig, Toulouse, Haute-Garonne, France Application August 16, 1954, Serial No. 449,976

Claims priority, application France December 11, 1953

3 Claims. (Cl. 204—212)

The present invention has, as an object, a method of and a device for subjecting fluids, regardless of their contents and composition to oligodynamical or electro-oligodynamical processes, or processes based on a change in the electric potential of the medium, with a view to obtain either the sterilization or the selection or the activation of the microbic fauna which develops in these fluids.

It is also an object of this invention to provide a method of and device for subjecting fluids regardless of their contents and composition to the coagulation or degradation of the substances contained in the fluids by passing these between electrodes made of the same material or of different materials, the action of which may be intensified by an electric current having a suitable density and voltage.

Devices are known which make it possible to effect treatments of this kind; it is necessary, however, with these devices, that there be few or no solid particles in suspension in the liquids to be treated, as these particles ionize and adhere to the electrodes of the treatment batteries used for applying such processes.

One purpose of the present invention is to obviate the above-mentioned drawback by creating a new device for applying these methods so as to make it possible to treat fluids containing in suspension solid particles, even if such particles are numerous and of various natures.

In accordance with the invention, the process for the continuous treatment and particularly sterilization, coagulation, oligodynamy and the selection of the microbic fauna in fluids is characterized in that these fluids are passed through a battery comprising electrodes connected with an electric current generator suitable for the treatment to be effected, these electrodes being rotated so that the solid and ionized particles contained in the fluid being treated are subjected to centrifugal action which prevents them from adhering to said electrodes.

According to another feature, the shape of the electrodes is selected according to the treatment to be effected.

According to a third feature, the electrodes are fed with alternating current, the voltage and density of which are determined according to the treatment to be applied.

In accordance with one embodiment of the device according to the invention, the battery comprises a casing supporting a shaft on which are mounted conducting elements acting as electrodes. Every second electrode is electrically connected by means of conducting rings carried by said shaft, with the input and output terminals of a current generator suitable for the treatment applied.

Various other features of the invention will appear from the following specification in connection with the drawing, in which:

Figure 1 is a diagrammatic elevation of the device according to the invention.

Figure 2 illustrates on a larger scale than that of Fig. 1 a section taken along the lines II—II in Figure 1.

Figure 1 shows a motor 1 preferably an electric motor for driving the device according to the invention.

The output shaft of motor 1 drives a transmission enclosed in a casing 2. This transmission may be a reducing or stepdown transmission, possibly coupled to a clutch adapted to be controlled automatically. This clutch may comprise means making it possible to reverse the direction of rotation of a shaft 3 which latter is intended to drive the device of the invention, said device being enclosed in a casing 4 mounted on a base 5.

As shown in Fig. 2, casing 4 comprises connections 6 and 7 for the inlet and outlet of the fluid to be treated which may for instance be a solution or a mixture of various liquids, a paste, fruit juices or the like.

The two sides 8 and 9 of the casing 4 have connected thereto bearings 10, 11 for supporting the shaft 3 which latter, as indicated above, is driven by the motor 1 through the intervention of the transmission in casing 2.

The bearings 10 and 11 are provided with packing material 12 compressed and held in position by means of threaded glands 13 threadedly engaging said bearings. That portion of shaft 3 which is located inside the casing 4 (Fig. 2) supports rings 14 made of an electrically insulating material and respectively provided with grooves 15. Fitted in grooves 15 are discs 16 of conducting material which may be made for instance of copper, silver or other materials depending on the nature of the products to be treated.

The rings 14 are furthermore provided with bores 17 registering with bores 18 in the discs 16. Springs or other electrically conducting elements 19 are arranged in said bores 17 so as electrically to connect every other disc.

In the embodiment shown, the disc 16a is connected with the disc 16b, while being insulated from the disc 16c, which in turn is electrically connected with the disc 16d. Disc 16d is insulated from the disc 16a and from the disc 16e, which follows it, and so on.

The number of discs carried by the shaft 3 varies according to the dimensions of the device.

As will appear from the drawing, the discs 16a and 16l are held against their insulating support rings 14 by conducting rings 20 and 21 which are respectively fitted in corresponding grooves of socket members 22 and 23.

The socket member 22 is held against a shoulder 25 of the shaft 3 by means of a washer 24, whereas the socket 23 is held in its position by means of a washer 26 and a nut 27 screwed on a threaded portion of the shaft 3 and surrounded by an insulating cap 28, also screwed on this threaded portion of the shaft.

The shaft 3 is provided with bores 29 and 30, in which are arranged sleeves 31a, 31 of insulating material, the interior of which communicates through radial channels 32a, 32 with channels 33, 33a respectively. The channels 33, 33a are provided in the cap 28 and socket member 22 respectively, which are of insulating material. The insulating cap 28 is screwed on shaft 3 independently.

At both sides of casing 4, conducting rings 34 and 35 are mounted on the shaft 3 by means of insulating sockets 36, 37. These rings 34, 35 are electrically connected to rings 21 and 20 respectively, by means of conductors 38, 39, passing inside sleeve 31a, 31, and channels 32a, 32 respectively.

As shown in Fig. 1, brushes 40, respectively connected to electrical conductors 41, 42 press in a continuous manner upon the rings 34, 35, so that the current in conductors 41, 42 passes to the discs 16 acting as electrodes.

In the embodiment shown, the current in conductor 42 and ring 34 energizes the discs 16a, 16b, 16e, etc., while the current in conductor 41 feeds the discs 16l, 16j . . . 16d and 16c.

The conductors 41 and 42 are connected with a generator which makes it possible to obtain a current having a voltage and a density corresponding to the treatment desired and which feeds the electrodes 16. The composition of said electrodes corresponds to the treatments desired. These treatments may consist in the application of oligodynamical or electro-oligodynamical processes or processes based on a change in electrical potential in the medium, to obtain a sterilizing action or a selection or activation of the microbic fauna which develops in the fluids to be treated. These treatments may also consist in the application of the processes effecting the coagulation or the degradation of the substances contained in the fluids when said fluids pass through the treatment battery.

Inasmuch as the electrodes formed by the discs 16 are rotated constantly, it is possible to treat all fluids, even those containing, in suspension, solid or solidifiable particles, when said fluids pass through the treatment battery, even in the case of coagulations or degradations of the component materials. This was not possible with the apparatus equipped with treatment batteries heretofore known, since the ionized particles settled, sooner or later on the walls of the electrodes, making the treatment inefficient.

In contrast thereto, with the device of the invention, the elements or particles which might tend to settle on the electrodes, are centrifuged so that they are automatically rejected.

The invention is not limited to the example or embodiment shown and described in detail, as various modifications may be made thereto within its scope. In particular, the shape of the electrodes may be different from that represented and, in addition, various cleaning elements may possibly be associated with said electrodes permanently or periodically so that they are always held in a perfectly clean condition.

We claim:

1. In a device for the continuous treatment and in particular the sterilization, coagulation, oligodynamics and selection of the microbic fauna of a liquid, the combination of: a rotatable shaft, a driving motor for rotating said shaft, a casing carrying said shaft, the major portion of said shaft being located inside said casing, inlet and outlet connections connected to said casing for respectively admitting fluid into and discharging fluid from said casing, two sets of spaced electrodes rotatably connected to said shaft, the electrodes of one of said sets being spaced from and alternate with the electrodes of the other set, two current conducting means respectively directly connected to the central portion of both sets of electrodes and arranged to feed electric current of one polarity to the electrodes of one of said sets and current of a different polarity to the electrodes of the other set, each of said current conducting means including resilient conductors resiliently interposed between and electrically connected to each two adjacent electrodes of the respective set of electrodes pertaining to the respective conducting means.

2. In a device for the continuous treatment of a liquid, in particular the sterilization, coagulation, oligodynamics and selection of the microbic fauna of a liquid, the combination of: a casing having an inlet and an outlet for respectively admitting fluid into and discharging fluid from said casing, a rotatable shaft extending through said casing, a driving motor arranged for rotating said shaft, two sets of electrodes arranged within said casing and rotatably connected to said shaft, the electrodes of one of said sets being spaced from and alternate with the electrodes of said other set of electrodes in axial direction of said shaft, two current conducting means respectively extending from the outside of said casing into the latter and each being respectively electrically connected to one electrode of each of said sets of electrodes, a first set of spring members electrically interconnecting all electrodes of one of said sets of electrodes, each of said spring members of said first set of spring members being respectively interposed between and resiliently and electrically engaging two adjacent electrodes of said one set of electrodes only, and a second set of spring members electrically interconnecting all electrodes of said other set of electrodes, each of the spring members of said second set of spring members being respectively interposed between and resiliently and electrically engaging two adjacent electrodes of said other set of electrodes.

3. In a device for the continuous treatment of a liquid, in particular the sterilization, coagulation, oligodynamics and selection of the microbic fauna in a liquid, the combination of: a casing having an inlet and an outlet for respectively admitting fluid into and discharging fluid from said casing, a rotatable shaft extending through said casing, a driving motor arranged for rotating said shaft, a plurality of insulating ring members mounted on said shaft within said casing and rotatably connected thereto and respectively engaging each other along a plane substantially transverse to the axial direction of said shaft, each two adjacent ring members defining therebetween a substantially annular recess, two sets of electrodes arranged within said casing, the electrodes being respectively mounted in the recesses defined by said ring members and being rotatably connected thereto, the arrangement being such that the electrodes of one set are spaced from and alternate with the electrodes of the other set in axial direction of said shaft, two current conducting means respectively extending from the outside of said casing into the latter and each being respectively electrically connected to one electrode of each of said sets, the two outermost ring members being provided with one bore and each of the other ring members being provided with a first bore and a second bore, all of said bores extending substantially parallel to the axis of said shaft, a first set of electrically conducting spring members respectively extending through the first bore of each of two adjacent ring members located between the two outermost ring members and through the bore of one of said outermost ring members for electrically interconnecting all electrodes of said one set of electrodes, and a second set of spring members respectively extending through the second bore of each of two adjacent ring members located between said two outermost ring members and through the bore of the other outermost ring member for electrically interconnecting all electrodes of said second set of electrodes, the spring members in said first bores being respectively interposed between and resiliently and electrically engaging two adjacent electrodes of said one set of electrodes, and the spring members in said second bores being respectively interposed and resiliently and electrically engaging two adjacent electrodes of said other set of electrodes.

References Cited in the file of this patent

UNITED STATES PATENTS

| 512,706 | D'Humy | Jan. 16, 1894 |
| 1,139,778 | Landreth | May 18, 1915 |
| 1,544,052 | Avery | June 30, 1925 |
| 1,862,663 | Curtis | June 14, 1932 |
| 2,061,323 | Meinzer | Nov. 17, 1936 |

FOREIGN PATENTS

| 1,161 | Great Britain | of 1888 |